United States Patent
Culpepper et al.

(10) Patent No.: US 7,423,414 B1
(45) Date of Patent: Sep. 9, 2008

(54) APPARATUS AND METHOD FOR SWITCHING REGULATOR WITH COMPENSATION DELAY FOR OUTPUT VOLTAGE ERROR CORRECTION

(75) Inventors: Barry James Culpepper, Sunnyvale, CA (US); Jeff L. Nilles, Los Altos, CA (US); Chunping Song, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 253 days.

(21) Appl. No.: 11/197,646

(22) Filed: Aug. 4, 2005

(51) Int. Cl.
*G05F 1/00* (2006.01)
(52) U.S. Cl. ........................ 323/280; 323/281
(58) Field of Classification Search ............ 323/280, 323/281, 279, 274
See application file for complete search history.

(56) References Cited

U.S. PATENT DOCUMENTS

| | | | | |
|---|---|---|---|---|
| 6,147,478 A | * | 11/2000 | Skelton et al. | 323/288 |
| 6,157,182 A | * | 12/2000 | Tanaka et al. | 323/284 |
| 6,348,780 B1 | * | 2/2002 | Grant | 323/222 |
| 6,980,445 B2 | * | 12/2005 | Fukumoto et al. | 363/45 |
| 7,053,595 B1 | * | 5/2006 | Mei et al. | 323/283 |

OTHER PUBLICATIONS

Rubiola, E. et al. (1992) "Noise Induced Time Interval Measurement Biases," 1992 *IEEE Frequency Control Symposium*, pp. 265-269.
Locascio, J. J. et al. (1993) "New IC's and Control Techniques for Battery Powered Systems," *Wescon/'93 Conference Record*, pp. 388-395.
Jurasek, G. et al. (1996) "High Efficiency Automotive Power Supply with Hysteretic Current Mode Controller," *Applied Power Electronics Conference and Exposition, IEEE*, vol. 2, pp. 861-868.
Alarcon, E. et al. (2001) "Sliding-Mode Control Analog Integrated Circuit for Switching DC-DC Power Converters," *IEEE*, pp. I-500-I-503.
Gu, Wei et al. (2001) "Interleaved Synchronous Buck Regulator with Hysteretic Voltage Control," *Power Electronics Specialist Conference, IEEE 32nd Annual*, vol. 3, pp. 1512-1516.
Gu, W. et al. (2002) "A Multiphase DC/DC Converter with Hysteretic Voltage Control and Current Sharing," *IEEE*, pp. 670-674.
Song, C. et al. (2005) "Accuracy Analysis of Hysteretic Current-Mode Voltage Regulator," *IEEE*, pp. 276-280.

* cited by examiner

*Primary Examiner*—Shawn Riley
(74) *Attorney, Agent, or Firm*—Darby & Darby P.C.; Matthew M. Gaffney (57) ABSTRACT

A hysteretic regulator is provided. The hysteretic regulator includes a delay compensation circuit that adds a delay to the output of the hysteretic comparator. The delay is dependent on the input voltage. For low duty cycles, the slope of the inductor current is much greater for the rising edge than it is for the falling edge. The delay compensation circuit adds sufficient delay to the falling edge so that the undershoot cancels the overshoot.

21 Claims, 5 Drawing Sheets

APPARATUS AND METHOD FOR SWITCHING REGULATOR WITH COMPENSATION DELAY FOR OUTPUT VOLTAGE ERROR CORRECTION

FIELD OF THE INVENTION

The invention is related to switching power converters, and in particular, to an apparatus and method for a hysteretic switching regulator with an input-voltage-dependent delay added to correct for overshoot error in the output voltage.

BACKGROUND OF THE INVENTION

Three basic switching power supply topologies commonly used are buck, boost, and buck-boost. Of these, the simplest and most common is the buck converter. Various methods have been used to control these power supplies in order to maintain an accurate and stable output voltage. Three of the most common methods are hysteretic control, pulse width modulation (PWM), and constant on-time (COT).

Single-phase voltage-mode hysteretic control, also called "bang-bang" control or ripple regulator control, typically maintains an output voltage within a hysteresis band centered about an internal reference voltage. If the output voltage reaches or exceeds the reference voltage plus one-half of the hysteresis band, the controller turns OFF the high-side switch, typically a Metal-Oxide Semiconductor Field-Effect Transistor (MOSFET), and turns ON the low-side switch, to block energy from being transferred from an input to an output. This latter condition is a power stage OFF-state, and causes the output voltage to decrease.

When the output voltage is at or below the level of the reference minus one-half of the hysteresis band, the power stage goes into ON-stage, and the controller turns ON the high-side switch, and turns OFF the low-side switch to allow energy transfer from the input to the output, which causes the output voltage to increase. This hysteretic method of control keeps the output voltage within the hysteresis band around the reference voltage.

Hysteretic control regulators typically include an error amplifier to correct for output errors, and a resistor-capacitor compensation loop to stabilize the frequency response of the regulator.

Another type of hysteretic control is current-mode hysteretic control, which may be used to maintain the inductor current within a hysteresis band.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a hysteretic regulator. The hysteretic regulator includes a delay compensation circuit that adds a delay to the output of the hysteretic comparator. The delay is dependent on the input voltage. For low duty cycles, the slope of the inductor current is much greater for the rising edge than it is for the falling edge. The delay compensation circuit adds sufficient delay to the falling edge so that the undershoot cancels the overshoot.

In addition to correcting overshoot errors caused by high or low duty cycles (relative to 50% duty cycle), embodiments of the invention may be employed to correct other errors, such as the inductor value varying with the inductor current. Further, embodiments of the invention may be employed with current-mode or voltage-mode regulation, with hysteretic regulation or constant on-time regulation, or the like.

Figure 1:
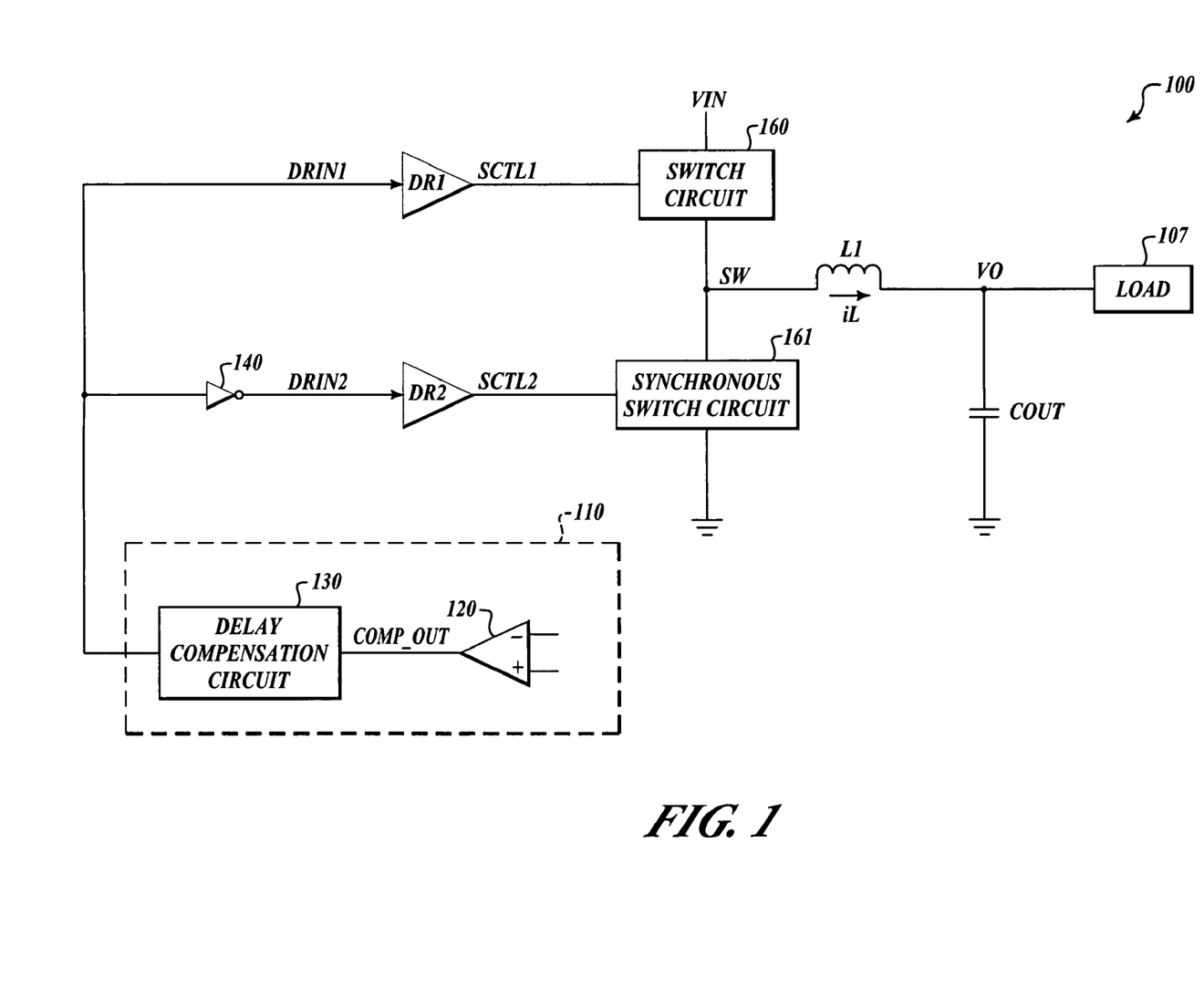
FIG. 1 illustrates a block diagram of an embodiment of a switching regulator.

FIG. 1 illustrates a block diagram of an embodiment of switching regulator 100. In one embodiment, switching regulator 100 includes switch circuit 160, synchronous switch circuit 161, inductor L1, output capacitor Cout, load 107, inverter 140, and regulator controller circuit 110. Regulator controller circuit 110 includes delay compensation circuit 130 and comparator 120. Connections to the inputs of comparator 120 are not shown in FIG. 1 because the input may be connected to different places in various embodiments of switching regulator 100.

In one embodiment, switching regulator circuit 100 is operable to provide regulated output voltage VO from input voltage VIN. Switch circuit 160 is operable to open and close based on switch control signal SCTL1. Similarly, in a synchronously-rectified embodiment, synchronous switch circuit 161 is operable to open and close based on synchronous switch control signal SCTL2. Inductor L1 may be arranged to provide inductor current iL to output capacitor Cout such that output voltage VO is provided.

Driver circuit DR1 is operable to provide switch control signal SCTL1 from signal DRIN1. In a synchronously-rectified embodiment, switching regulator 100 includes driver circuit DR2, which is operable to provide switch control signal SCTL2 from signal DRIN2.

Comparator 120 is operable to provide comparator output signal Comp_out based, in part, on output voltage VO and/or inductor current iL. Further, delay compensation circuit 130 is arranged to provide driver input signal DRIN1 by adding a delay to signal Comp_out. The delay is sufficient to correct for at least one error in output voltage VOUT.

In one current-mode hysteretic control embodiment, sufficient delay is added to correct for overshoot error for high duty cycles that results because, for low duty cycles, the slope of the inductor current is much greater for the rising edge than at is for the falling edge. In this embodiment, a delay proportional to input voltage VIN is added to the off-time.

Conversely, in another hysteretic control-mode control embodiment, sufficient delay is added to correct for undershoot error for low duty cycles. In this embodiment, a delay proportional to input voltage VIN is added to the on-time.

In one voltage-mode control hysteretic embodiment, overshoot or undershoot error is corrected by adding delay to the on-time or the off-time.

Although embodiments involving a switching regulator with hysteretic control are discussed above, in another embodiment, the switching regulator uses a constant-on time scheme. In one embodiment in which a constant-on-time scheme is employed, a delay is added to the off-time to correct for overshoot error.

In one embodiment, the delay is added to correct for the inductor value varying with inductor current. For example, in one embodiment, inductor L1 is an on-chip inductor. If the inductor current exceeds a particular value, the inductor saturates, and the inductor value is significantly reduced to a free-air value. In one embodiment, the inductor current is monitored, and if the inductor value is exceeds the value at which the inductor saturates, additional delay is added to the off-time to compensate for the error in output voltage VOUT caused by the change in the inductance.

Although one embodiment of switching regulator 100 is illustrated in FIG. 1, many other embodiments are within the scope and spirit of the invention. For example, as discussed above, hysteretic control embodiments and constant-on time embodiments are both within the scope and spirit of the invention. Further, as discussed above, both voltage-mode and current-mode control embodiments are within the scope and spirit of the invention. Additionally, current-mode control embodiment may include embodiments which sense the current by any number of different ways, including using a sense transistor, using a sense transistor, DCR sensing, or the like.

Also, although a buck topology is illustrated in FIG. 1, boost topologies, buck/boost topologies, and the like, are also within the scope and spirit of the invention. Additionally, although a synchronously-rectified embodiment is shown in FIG. 1, asynchronously-rectified switching regulators may also be employed. These variations and others are within the scope and spirit of the invention.

Figure 2:
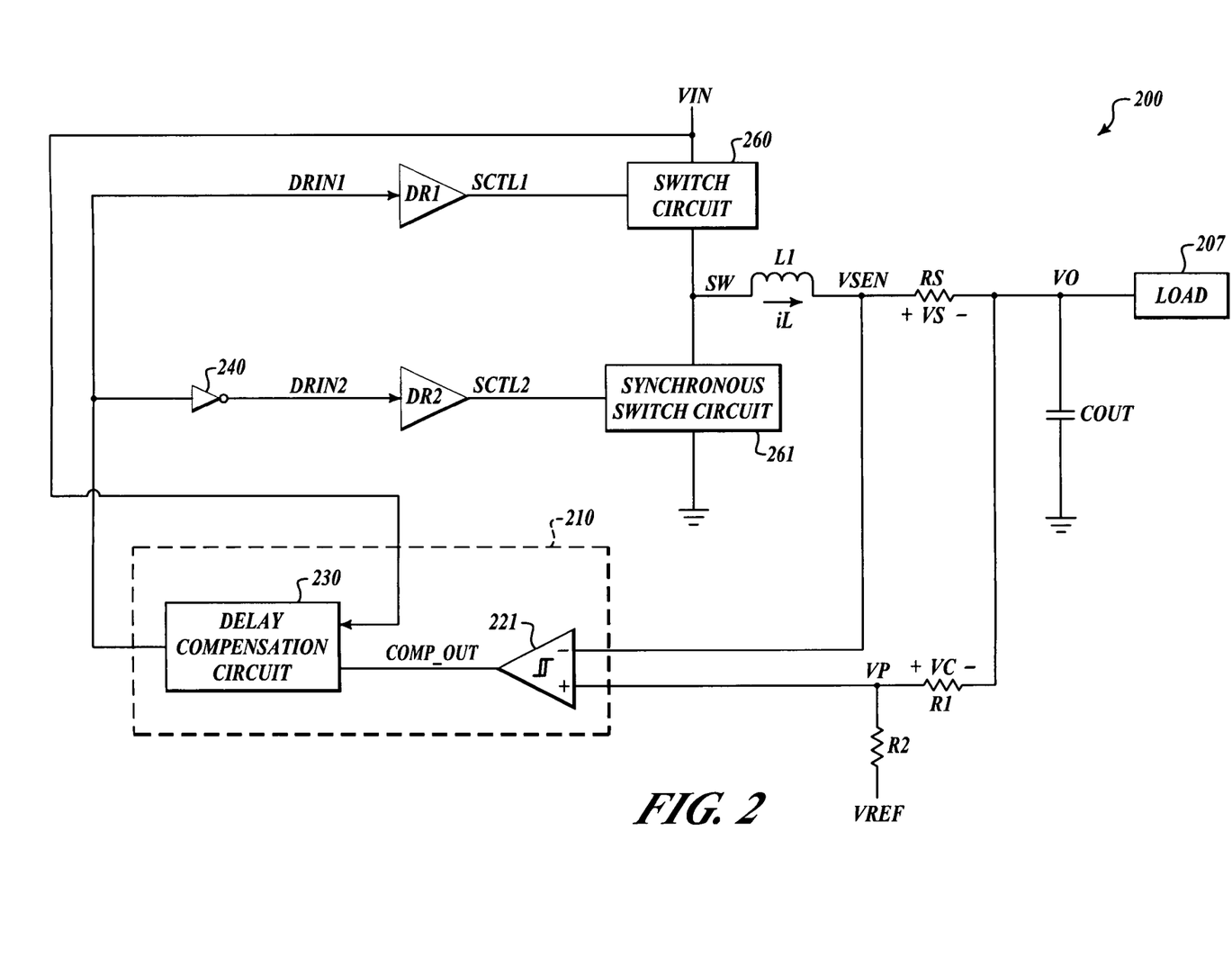
FIG. 2 shows a block diagram of a current-mode hysteretic embodiment of the switching regulator of FIG. 1 which employs a sense resistor as the current sensing method.

FIG. 2 shows a block diagram of hysteretic current-mode regulator 200, which is an embodiment of switching regulator 100 of FIG. 1. Regulator 200 further includes resistor R1, resistor R2, and sense resistor Rs. Hysteretic comparator 221 is an embodiment of comparator 120 of FIG. 1.

Ignoring delays, output voltage VO may be given by approximately $VO=V_{ref}-k \cdot R_s \cdot I_L$, where $k=(R1+R2)/R1$.

Ignoring the effect of delay compensation circuit 230, but taking into account typical fixed delays due to both the falling and rising edge of hysteretic comparator 221, drivers DR1 and DR2, and switch circuits 260 and 261, output voltage VO is adjusted as follows. The total delay from each of these delays may be represented as a total delay td. There is now an output offset Voffset which is dependent on total delay td, VIN, duty cycle, and some component values. This Voffset error is now given by the equation:

$$Voffset=k \cdot td \cdot R_s \cdot (VIN-2VO)/(2 \cdot L),$$

where L represents the inductance of inductor L1.

The Voffset is primarily due to overshoot of inductor current iL, because it takes time to shut off the powerFETs being controlled by hysteretic comparator 221. Since the current slope is higher for the rising edge then the falling edge for low duty cycles, this delay does not cause as much undershoot on the negative edge. Without correcting for this error, output voltage VO is higher than it should be.

In one embodiment, delay compensation circuit 230 is operable to vary the delay on one of the two edges to balance the overshoot currents discussed above. This is done by adding extra delays on any edge, which controls the offset correction. In one embodiment, delay compensation circuit 230 is operable to create a delay proportional to VIN. In this embodiment, an error amplifier is not needed in regulator 200, nor is a compensation network needed.

In other embodiments, delay compensation circuit 230 corrects for other errors to the output instead of or additional to the error caused by high or low duty cycle as discussed above. For example, as discussed above, another case for correction is correcting for inductor values varying with inductor current. In this embodiment, output voltage VO has a delay correction dependent on inductor current iL.

Many embodiments of regulator 200 are within the scope and spirit of the invention. FOr example, as previously discussed, an asynchronously-rectified switching regulator may be used; in this embodiment, the voltage across the diode needs to be taken into account in the above equations. Also, although FIG. 2 illustrates an embodiment of regulator 200 in which a sense resistor is employed for current sensing, in other embodiment, a different type of current sensing may be employed, such as a sense transistor, DCR sensing, or the like.

Figure 3:
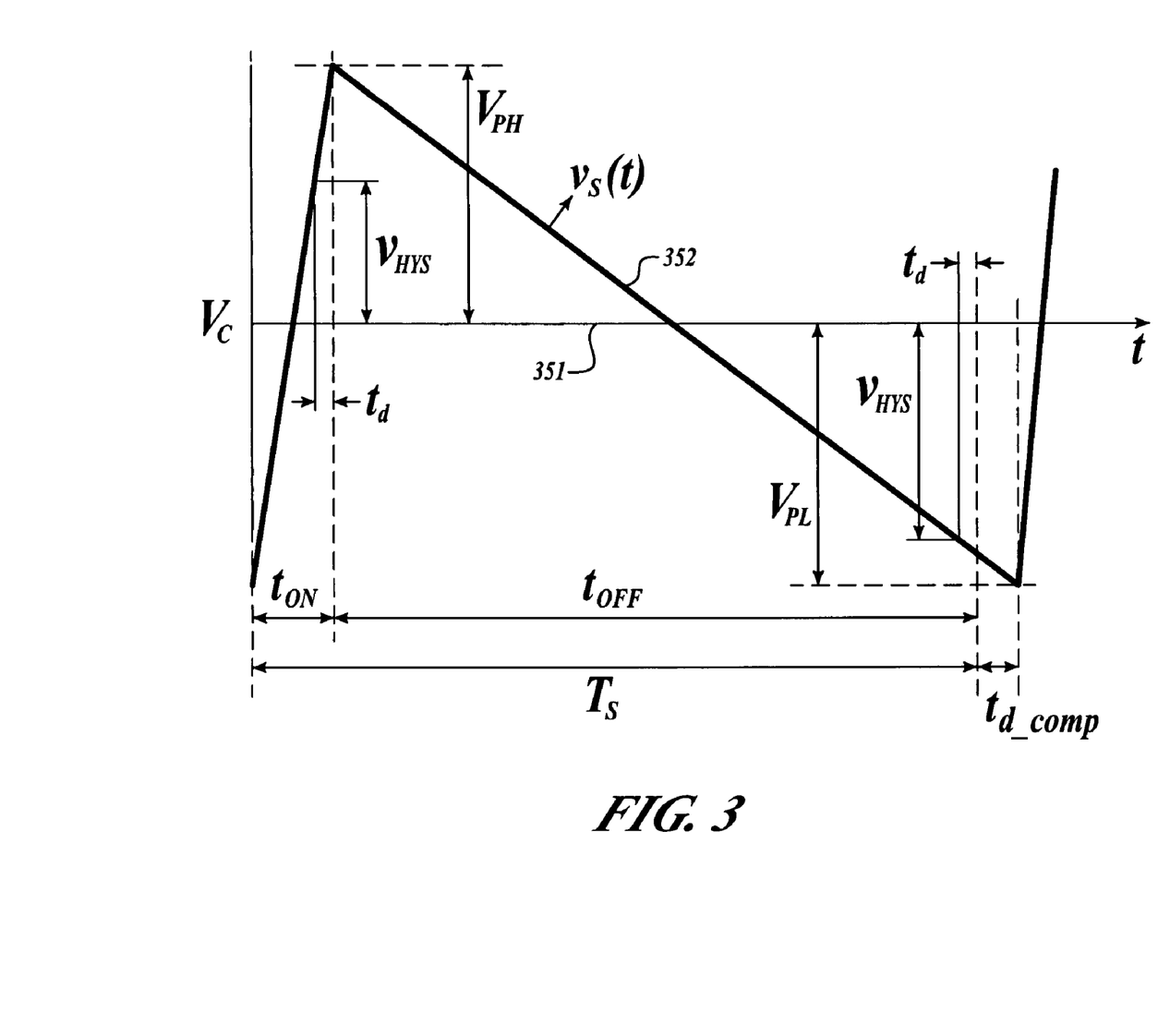
FIG. 3 shows a diagram of waveforms of embodiments of signals from an embodiment of the switching regulator of FIG. 2.

FIG. 3 shows a timing diagram of waveforms of embodiments of signals from an embodiment of switching regulator 200 of FIG. 2. Waveform 351 is a waveform of an embodiment of current command voltage Vc of FIG. 2. Waveform 352 is a waveform of an embodiment of current sense voltage Vs of FIG. 2, where voltage Vs is an embodiment of the voltage drop across resistor Rs of FIG. 2.

As illustrated in FIG. 3, overshoot error is approximately corrected by adding additional delay to the bottom part of the falling edge of waveform 352.

Vhys is the hysteresis voltage. During on time ton, once voltage Vs reaches Vc+Vhys, hysteretic comparator 221 trips. Inductor current iL changes direction when voltage Vs reaches Vc+Vhys after a delay time td. During off time toff, once voltage Vs reaches Vc−Vhys, hysteretic comparator 221 trips the other way. Inductor current changes directions when Vs reaches Vc−Vhys after the delay time td plus another delay time td_co. Delay time td_co is the delay time added by delay compensation circuit 230. In one embodiment, delay time td_co may be given by td_co=td*(VIN−2VO)/VO.

Figure 4:
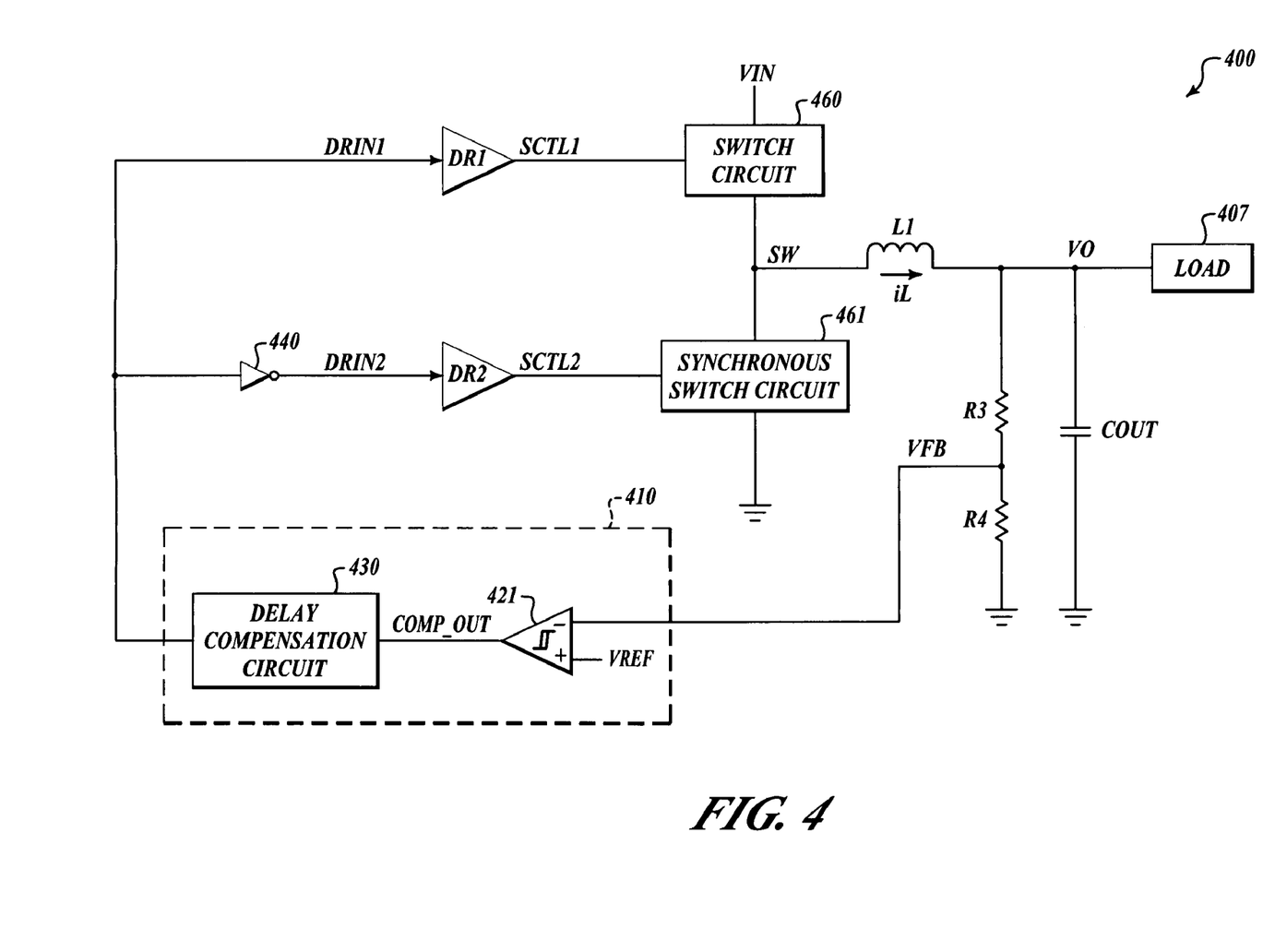
FIG. 4 illustrates a block diagram of an embodiment of the voltage-mode hysteretic embodiment of the switching regulator of FIG. 1.

FIG. 4 illustrates a block diagram of an embodiment of switching regulator 400, which is an embodiment of switching regulator 100 of FIG. 1. Switching regulator 100 is a hysteretic voltage-mode embodiment of the switching regulator of FIG. 1.

Figure 5:
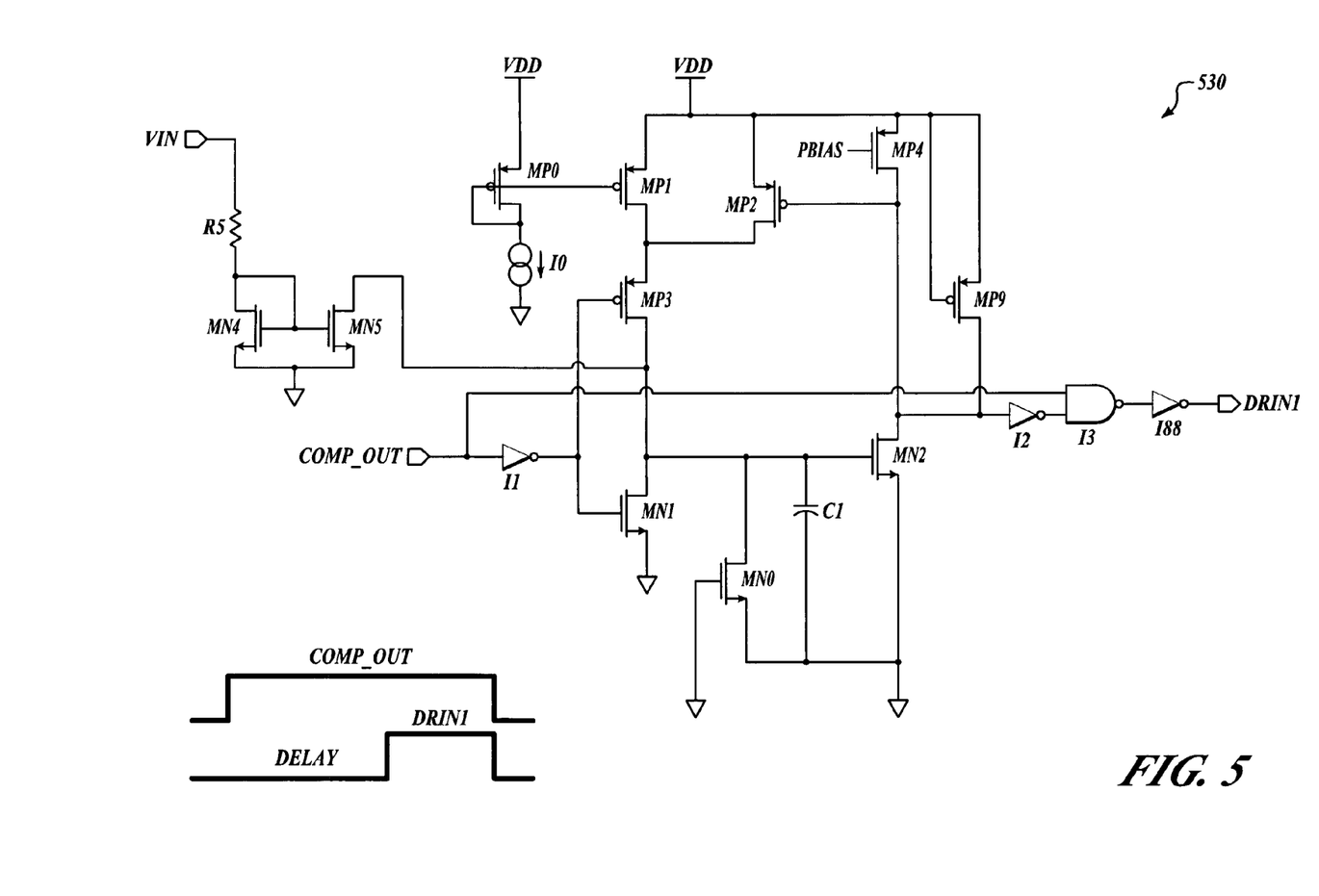
FIG. 5 shows a schematic diagram of an embodiment of the delay compensation circuit of FIG. 2, arranged in accordance with aspects of the present invention.

FIG. 5 shows a schematic diagram of an embodiment of delay compensation circuit 530. Delay compensation circuit 530 is an embodiment of delay compensation circuit 230 of FIG. 2.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulation, comprising:
   a regulator controller that is operable to control conversion of an input voltage to a regulated output voltage, wherein the regulator controller includes:
   a comparator that is operable to provide a comparator output signal that is based, in part, on at least one of an inductor current or the regulated output voltage; and
   a delay compensation circuit that is operable to provide a driver input signal from the comparator output signal by adding a compensation delay to the comparator output signal such that the compensation delay is sufficient to approximately correct an error in the regulated output voltage, wherein the regulated output voltage is based, in part, on the driver input signal.

2. The circuit of claim 1, wherein the compensation delay is sufficient to approximately correct for overshoot error in the regulated output voltage caused by a duty cycle of the comparator output signal being greater than 50%.

3. The circuit of claim 1, wherein the compensation delay is sufficient to approximately correct for undershoot error in the regulated output voltage caused by a duty cycle of the comparator output signal being less than 50%.

4. The circuit of claim 1, wherein the compensation delay is sufficient to approximately correct for overshoot error caused by reduced inductance of an inductor occurring with increased inductor current.

5. The circuit of claim 1, wherein the circuit for regulation has one of a buck, boost, or buck/boost topology.

6. The circuit of claim 1, further comprising:
   a switch circuit that is coupled between the input voltage and a switch node, wherein the switch circuit has a control input;
   a driving having: an input that is coupled to the driver input signal, and an output that is coupled to the control input of the switch circuit; and
   an inductor that is coupled between the switch node and the regulated output voltage, wherein the inductor is operable to provide the inductor current.

7. The circuit of claim 1, wherein the regulator controller is a constant-on-time regulator controller.

8. The circuit of claim 1, wherein the regulator controller is a hysteretic regulator controller; the comparator is a hysteretic comparator; the hysteretic comparator includes a first input and a second input; the hysteretic comparator is arranged to receive a first comparator input voltage (V1) at the first input of the hysteretic comparator; the hysteretic comparator is arranged to receive a second comparator voltage (V2) at the second input of the hysteretic comparator; and wherein the hysteretic comparator is operable to assert the comparator output signal if the first voltage V1 reaches V2+Vhys after a time delay td), where Vhys represents a hysteresis voltage that is associated with the hysteretic comparator; and wherein the hysteretic comparator is operable to unassert the comparator output signal if the first voltage V1 reaches V2+Vhys after approximately the time delay td.

9. The circuit of claim 8, wherein the regulator controller does not include an error amplifier.

10. The circuit of claim 8, further comprising:
    a voltage divider, including a first resistor that is coupled between the regulated output voltage and a node, and a second resistor that is coupled between the node and ground, wherein the first voltage is provided at the node; and
    a reference voltage circuit that is arranged to provide the second voltage.

11. The circuit of claim 8, further comprising:
    a sense resistor that is coupled between the output voltage and the first input of the hysteretic comparator;
    a reference voltage circuit having at least an output;
    a first resistor that is coupled between the output voltage and the second input of the hysteretic comparator; and
    a second resistor that is coupled between the second input of the hysteretic comparator and the output of the reference voltage circuit.

12. The circuit of claim 8, wherein the compensation delay is approximately td*(VIN−2VO)/VO, where VIN represents the input voltage and VO represents the regulated output voltage.

13. A circuit for regulation, comprising:
    a hysteretic power regulator controller that is operable to control hysteretic conversion of an input voltage to a regulated output voltage, wherein the hysteretic power regulator controller includes:
    a hysteretic comparator that is operable to provide a hysteretic comparator output signal that is based, in part, on at least one of an inductor current or the regulated output voltage; and
    a delay compensation circuit that is operable to provide a driver input signal from the hysteretic comparator output signal by adding an input-voltage-dependent delay to the hysteretic comparator output signal such that the input-voltage-dependent delay is sufficient to approximately correct overshoot error in the regulated output voltage, wherein the regulated output voltage is based, in part, on the driver input signal.

14. The circuit of claim 13, wherein the hysteretic power regulator controller does not include an error amplifier, and does not include a compensation network.

15. A method for error correction, comprising:
    converting an input signal into a regulated output signal, wherein converting the input signal into the regulated output signal includes:
    performing a comparison to provide a comparison output signal, wherein the comparison is based, in part, on at least one of an inductor current and the regulated output signal;
    providing a delay compensation output signal by adding a compensation delay to the comparator output signal such that the compensation delay is sufficient to approximately correct an error in the regulated output voltage; and
    driving a switch based, at least in part, on the delay compensation output signal.

16. The method of claim 15, wherein performing the comparison includes comparing a current command voltage with a current sense voltage, wherein the current sense voltage is based, in part, on the inductor current.

17. The method of claim 15, wherein performing the comparison includes comparing a feedback voltage with a reference voltage; wherein the feedback voltage is based, in part, on the regulated output voltage.

18. The method of claim 15, further comprising:
employing an inductor to provide the inductor current, wherein providing the delay compensation output signal includes:
determining whether the inductor current reaches a current limit that corresponds to a current value at which the inductance of the inductor changes to a free-air value; and
if the inductor current reaches the current limit, adding sufficient compensation delay that the regulated output voltage is substantially unchanged when the inductance changes to the free-air value.

19. The method of claim 15, wherein:
performing the comparison includes:
comparing a first voltage with a second voltage;
asserting the comparison output signal if the first voltage reaches the second voltage plus a hysteresis voltage after a delay time (td); and
unasserting the comparison output signal if the first voltages reaches the second voltage minus a hysteresis voltage after about the delay time (td).

20. The method of claim 19, wherein providing the delay compensation output signal includes:
adding a delay of about td*(VIN−2VO)/VO to the falling edge of the comparator output signal to provide the delay compensation output signal, wherein VIN represent the input voltage and VO represents the regulated output voltage.

21. The circuit of claim 1, wherein the delay compensation circuit is operable to provide the driver input signal from the comparator output signal by adding the compensation delay to the comparator output signal whenever the comparator is operating.

* * * * *

UNITED STATES PATENT AND TRADEMARK OFFICE
CERTIFICATE OF CORRECTION

PATENT NO. : 7,423,414 B1  
APPLICATION NO. : 11/197646  
DATED : September 9, 2008  
INVENTOR(S) : Barry J. Culpepper et al.

It is certified that error appears in the above-identified patent and that said Letters Patent is hereby corrected as shown below:

On the Title Page Item (56) under "Other Publications", line 11, delete "I-500-I-503" and
insert -- 500-503 --, therefor.

In column 4, line 11, delete "The" and insert -- This --, therefor.

In column 4, line 34, delete "FOr" and insert -- For --, therefor.

In column 4, line 56, delete "toff," and insert -- $t_{OFF}$, --, therefor.

In column 5, line 45, in claim 6, delete "driving" and insert -- driver --, therefor.

In column 5, line 63, in claim 8, delete "td)," and insert -- (td), --, therefor.

In column 5, line 67, in claim 8, delete "V2+Vhys" and insert -- V2-Vhys --, therefor.

In column 6, line 66, in claim 17, delete "voltage;" and insert -- voltage, --, therefor.

In column 7, line 13, in claim 19, delete "wherein:" and insert -- wherein --, therefor.

In column 8, line 8, in claim 20, delete "wherein" and insert -- where --, therefor.

Signed and Sealed this

Second Day of December, 2008

JON W. DUDAS  
*Director of the United States Patent and Trademark Office*